T. A. CONKLIN.

TACK HAMMER.

No. 3,308. Reissued Feb. 23, 1869.

Witnesses

Julius Ives

W. E. Dey.

Signature.

Thomas A. Conklin

By his attorney

T. D. Stetson

N. PETERS, Photo-Lithographer, Washington, D. C.

United States Patent Office.

THOMAS A. CONKLIN, OF NEW BRITAIN, CONNECTICUT.

*Letters Patent No.* 71,986, *dated December* 10, 1867; *reissue No.* 3,308, *dated February* 23, 1869.

IMPROVEMENT IN TACK-HAMMERS.

The Schedule referred to in these Letters Patent and making part of the same.

*To all whom it may concern:*

Be it known that I, THOMAS A. CONKLIN, of New Britain, in the county of Hartford, in the State of Connecticut, have invented a certain new and improved Construction of Tack-Hammer; and I do hereby declare that the following is a full and exact description thereof.

My hammer is cast entire, in one piece of metal, head, handle, and claw. The handle is hollowed, and presents a large surface with little material. The whole is coated, to give it an unoxidizable surface, and the hammer possesses, in consequence of its novel construction, useful qualities which have never before been realized.

I will proceed to describe what I consider the best means for carrying out my invention.

The accompanying drawings form a part of this specification.

Figure 1 is a side elevation,

Figure 2:
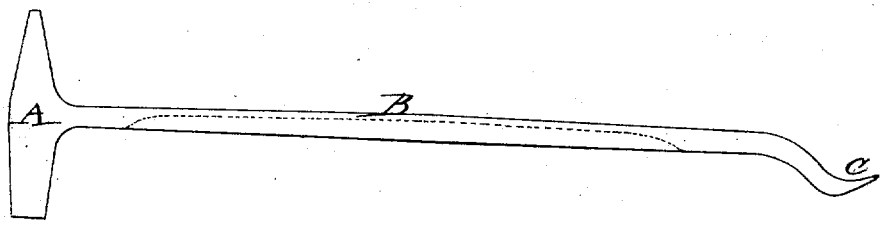
Figure 2 is a top view.
Figure 3:
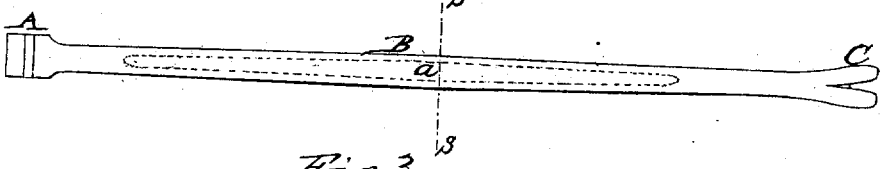

Figure 3, a cross-section on the middle of the helve, or handle.

Similar letters of reference indicate like parts in all the figures.

I make the hammer, by preference, of malleable cast-iron, but a portion of the advantages of my invention may be obtained by making it of other material.

A is the head,

B, the helve, and

C, the claw, adapted to remove tacks, as will be obvious.

The helve is hollowed on one side, as indicated by *a*.

The metal, after being bit with acid, is tinned all over. Much use tends to remove the tin on the face of the head A, but all the other parts of the hammer will ordinarily remain coated.

The hammer, when made from tough iron, will bear dropping on the floor, and any of the ordinary violence to which such an article is exposed.

While ordinary tack-hammers are almost certain to fail in a few months, from a loosening of the connection between the head and the ordinary wooden handle, my improved hammer will endure for an indefinite period.

Other protection for the surface, than tinning, may be availed of, if preferred.

I propose, in some cases, to clean the surface of the metal and to coat it with japan varnish, after which it is exposed to heat in the ordinary manner of japanning, which produces a very desirable coating.

I am aware that efforts have been previously made to produce a successful hammer, having both handle and head in one piece, but the hammers have failed to possess all the qualities which I have combined in mine, and have for this reason failed to meet the wants of the community.

My hammer meets a widely-extended want, and is highly appreciated.

Having now fully described my invention,

What I claim as new, and desire to secure by Letters Patent, is—

The cast-metal tack-hammer, consisting of the head A, hollow handle B, and claw C, in a single piece, the whole coated, substantially as and for the purposes herein set forth.

In testimony whereof, I have hereunto set my hand, in presence of two subscribing witnesses.

T. A. CONKLIN.

Witnesses:

W. C. DEY,

C. C. LIVINGS.